June 9, 1931.  H. D. MATTHEWS  1,809,305

THERMOSTAT

Filed Aug. 14, 1924

WITNESSES:
C. J. Weller.
Lester G. Dudley.

INVENTOR
Howard D. Matthews.
BY
Chesley G. Carr
ATTORNEY

Patented June 9, 1931

1,809,305

UNITED STATES PATENT OFFICE

HOWARD D. MATTHEWS, OF EDGEWOOD, PENNSYLVANIA, ASSIGNOR TO WESTINGHOUSE ELECTRIC & MANUFACTURING COMPANY, A CORPORATION OF PENNSYLVANIA

THERMOSTAT

Application filed August 14, 1924. Serial No. 731,975.

My invention relates to thermostats and particularly to bimetallic thermostats.

One object of my invention is to provide a thermostat that shall operate with a snap action.

Another object of my invention is to provide a thermostat that shall move from a set position upon its reaching a predetermined temperature and that shall return to its original position when it has again cooled to the predetermined temperature.

A further object of my invention is to provide a thermostat that shall be compact in form, simple to manufacture and comprise a relatively small number of parts.

In the accompanying drawings,

Figs. 5, 6 and 7 are diagrammatic views of the thermostat in the circuit-closing position, circuit-opening position and an intermediate position, respectively.

Figure 1:
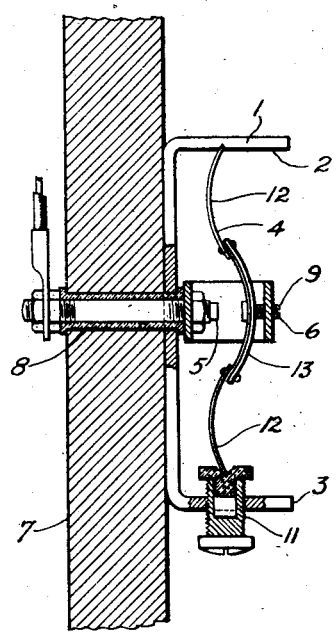
Figure 1 is a side elevational view of a thermostat embodying my invention in a circuit-opening position.

My invention comprises, in general, a frame 1 having upturned ends 2 and 3 for supporting a composite thermostatic member 4 that moves between stationary contact members 5 and a stop 6.

The stationary contact members 5 may extend through a suitable base member 7, such as a panel board, from which they are insulated by insulating bushings 8 for the purpose of securing the thermostat 1 thereto. The stop 6 comprises an adjustable screw 9, and a suitable adjusting screw 11 is mounted in either one of the upturned ends 2 and 3, as desired, for controlling the longitudinal pressure exerted on the thermostatic member 4.

The composite thermostatic member 4 comprises a pair of resilient springs 12, one end of each of which engages one of the upturned ends 2 and 3. The springs 12 are preferably composed of steel or bronze and are given a slightly concave shape. Intermediate the springs 12 is placed a strip of bimetallic material 13 that is composed of layers of material having different thermo co-efficients of expansion, such as copper and nickel-steel. The strip 13 is given a slight curvature, with the material having the higher coefficient of expansion forming the convex surface thereof. It has been found that the relay works equally well in a reverse direction if the direction of curvature of the bimetal is reversed.

When subjected to changes in temperature, the bimetallic strip 13 tends to bend in such manner as to decrease its radius of curvature, or shorten the length of the cord subtended by itself, with the result that the compression in the springs 12 varies. The direction of curvature in the members 12 and 13 never changes, although their several radii of curvature do change during temperature changes.

Figure 2:
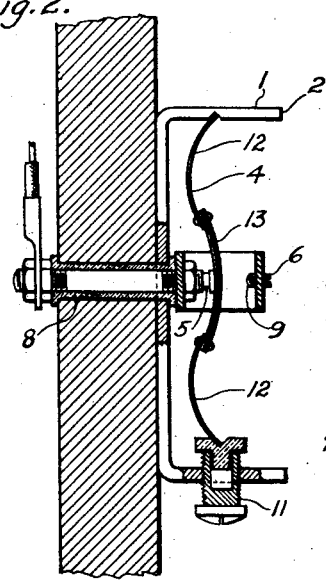
Fig. 2 is a similar view showing the thermostat in the circuit-closing position.
Figure 3:
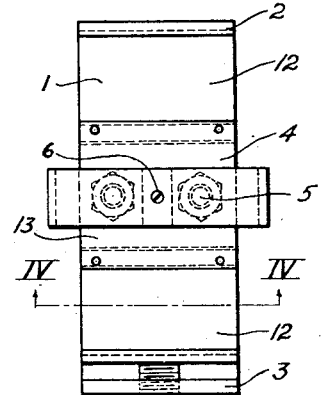
Fig. 3 is a front elevational view of the thermostat shown in Figs. 1 and 2.
Figure 4:
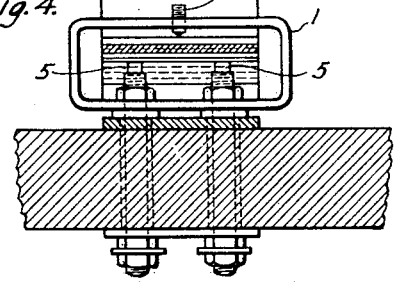
Fig. 4 is a view, partially in elevation and partially in section, taken along the cross-section line IV—IV of Fig. 3.
Figure 4:
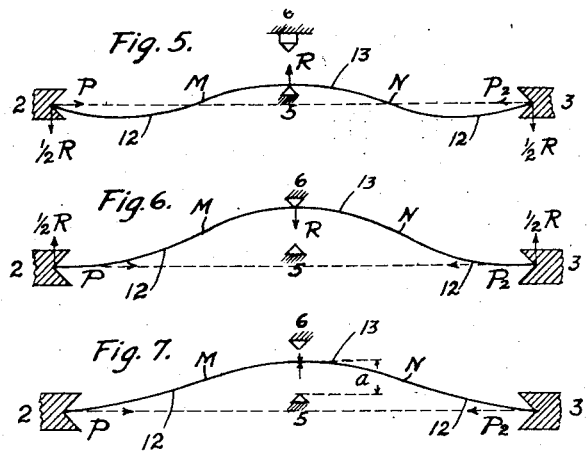

Fig. 5 shows the conditions existing when the thermostat 1 is in the circuit-closing position shown in Fig. 2. The stationary contact members 5 bear against the bimetallic member 13 with a composite force that is expressed by the arrow R, the direction of which is outward from the frame of the thermostat 1. At the same time, the composite force R is opposed by components of force R/2 exerted by the ends 2 and 3 in an inward direction. Also forces P, $P_2$ are directed longitudinally of the bimetallic strip 4. This position of the composite thermostat strip 4 may be termed a position of stable equilibrium.

In Fig. 6, the thermostatic strip 4 is shown in another position of stable equilibrium where the stop 6 exerts an inwardly directed force R against the thermostat, and the upturned edges 2 and 3 exert outwardly directed forces R/2 against the thermostat. This position of the thermostat is also a stable position but it represents conditions substantially opposite to those found in Fig. 5. If the longitudinal forces P and $P_2$ or the lateral forces R are varied slightly when the thermostat is in either of its stable positions, the thermostat will accommodate itself to them and retain the relative position shown in Figs. 5 and 6.

In Fig. 7 is shown a position of the thermostat 4 in which the lateral directed forces $\frac{R}{2}$ and R are equal to zero and the thermostat is subjected only to the longitudinal forces P and $P_2$. The distance between the stationary contact members 5 and this neutral or unstable position of the thermostat is indicated by the letter $a$. A lateral thrust in either direction applied to the thermostat in this position results in the thermostat snapping to one of the stable positions of equilibrium against the stop 6 or the stationary contact members 5. From the foregoing, it is apparent that, if the stop 6 is placed at a position of less than a length from the stationary contact members 5, the thermostatic strip 4 will either bear against the stationary contact members 5 or against the stop 6 and there will be a tendency for the thermostatic member to return to the engagement with the stationary contact members 5, or to a stable position.

Since the bimetallic element 13 is placed with the metal having the higher co-efficient of expansion on the convex side thereof, in the preferred form, an increase in temperature of the thermostat 1 causes the connected ends of the springs 12 to be drawn toward each other, with a resultant disturbance of the several lateral thrust $\frac{R}{2}$ and R. Continued decrease in the values of the reactances R causes the thermostatic strip 4 to tend to move to the neutral or unstable position illustrated in Fig. 7, at the time when the reactive couple R and $\frac{2R}{2}$ becomes zero. When this condition is reached, the thermostatic element 4 buckles in the direction of the neutral or unstable position but is intercepted in its travel by the stop 6.

Accordingly, the element 4 remains in engagement with the stop 6 so long as the element 4, as a unit, tends to approach the neutral or unstable position of equilibrium. When the element 4 has dropped in temperature sufficiently to cause the reactive forces $\frac{R}{2}$ and R to again assume the direction indicated in Fig. 5, the thermostatic element returns, with a buckling action, into engagement with the stationary contact members 5. The foregoing cycle of operations may be carried on indefinitely, and the values at which the snapping or buckling action takes place may be varied by adjusting the screws 9 and 11.

While I have shown the composite thermostatic strip 4 as a contact making member, it is believed to be obvious that suitably insulated contact members might be mounted thereon for completing a circuit between the stationary contact members 5. The thermostat might be used for making a circuit rather than breaking a circuit, as is here illustrated. Also the bimetallic element 13 may extend the entire distance between the supports 2 and 3, thereby eliminating the springs 12.

Accordingly, I have devised a thermostat that is characterized by having two positions of stable equilibrium and a position of unstable equilibrium by imposing a stop member at a distance from a stationary contact member that is less than a distance to the position of neutral or unstable equilibrium. The composite thermostatic member makes a firm engagement with the stationary contact members, as well as with the stop member. The foregoing advantages are attained by mounting a bimetallic member between two metallic springs in such manner that the changes in shape of the bimetallic member, due to changes in the temperatures thereof, cause the forces exerted by the composite member against its supports to change directions. Changes in the direction of these forces cause the composite thermostatic member to snap or buckle into a position approaching a neutral or unstable position of equilibrium. Upon the restoration of all normal thermostatic conditions in the thermostatic material, the composite thermostatic member returns from the position of unstable equilibrium to its original position of stable equilibrium.

It will be understood that various changes in shape and form of the several parts of this invention may be made within the scope of the appended claims.

I claim as my invention:

1. In a thermostat, a frame, a plurality of curved stressed members co-operating with the frame and a curved thermoresponsive member supported by the stressed members for controlling the radii of curvature of the stressed members.

2. In a thermostat, a frame, a thermal-responsive member having a plurality of curved stressed portions co-operating with the frame and a curved central portion supported by the stressed portions for varying the radii of curvature of the stressed portions by reason of changes in its thermal condition.

3. In a thermostat, a frame, a thermal-responsive member having a plurality of stressed portions co-operating with the frame and a central portion supported by the stressed portions for varying the position of the center of mass of the thermal-responsive member and the stressed portions by reason of changes in the thermal condition of the thermal-responsive member.

4. In a thermostat, a frame, and a member comprising a plurality of stressed curved portions co-operating with the frame and a curved bimetallic portion supported by the stressed portions.

5. In a thermostat, a frame, and a member comprising a plurality of portions co-operating with the frame and held thereby in a stressed condition, and a curved bimetallic portion supported by the stressed portions for controlling the degree of stress in said portions.

6. In a thermostat, a frame, and a thermostatic member having a plurality of curved stressed portions co-operating with the frame and a reverse curved portion supported by the stressed portions for controlling the radii of curvature of the stressed portions.

7. In a thermostat, a frame, and a thermostatic member having a plurality of curved stressed portions co-operating with the frame and a co-operating portion supported by the stressed portions for varying the radii of curvature of the stressed portions by reason of changes in its thermal conditions.

8. In a thermostat, a frame, a thermostatic member having a plurality of curved stressed portions co-operating with the frame and a curved bimetallic portion supported by the stressed portions for varying the position of the center of mass of the bimetallic portion and the stressed portions by reason of changes in the thermal condition of the bimetallic portion.

9. In a thermostat, a frame, a thermostatic member having a plurality of curved portions co-operating with the frame and held thereby in a stressed condition and a curved thermo-responsive portion supported by and between the stressed portions for causing a gradual change in the internal stresses of the curved portions until a state of unstable equilibrium is reached at which the center of mass of the thermoresponsive portion and the stressed portions suddenly shifts in response to a thermal condition of the thermostatic member.

10. In a thermostat, a frame, a thermostatic member having a plurality of curved stressed portions co-operating with the frame and a curved thermoresponsive portion supported by and between the stressed portions whereby changes in the thermal conditions of the thermoresponsive portion during heating and cooling cause a gradual change in the internal and external stresses of the stressed portions until a different state of equilibrium is reached at which time the center of mass of the thermo-responsive portion and the stressed portions suddenly shifts.

11. In a thermostat, a frame, a thermostatic member comprising a plurality of stressed portions co-operating with the frame and a thermoresponsive portion supported by the stressed portions, and means for varying the degree of stress in the stressed portions.

12. In a thermostat, a frame, a thermostatic member comprising a plurality of stressed portions co-operating with the frame and a thermoresponsive portion supported by the stressed portions, and means co-operating with the frame for varying the degree of stress in the stressed portions.

13. In a thermostat, a frame, a thermostatic member comprising a plurality of stressed portions co-operating with the frame and a thermoresponsive portion supported by the stressed portions, and an adjustable screw mounted in the frame for varying the degree of stress in the stressed portions.

14. In a thermostat, a frame, a thermostatic member comprising a plurality of stressed portions co-operating with the frame and a thermoresponsive portion supported by the stressed portions, and an adjustable screw and a sliding block mounted in the frame for varying the degree of stress in the stressed portions.

15. In a thermostat, the combination with supporting means, of a curved thermostatic member, only the central portion of which is bimetallic.

16. In a thermostat, the combination with supporting means in a stressed condition, of a member held by the supporting means and having a resilient portion and a thermal-responsive portion.

17. A thermo-responsive circuit-controlling device comprising a member of U-shape and an initially stressed and curved bimetallic member disposed between the ends of the member of U-shape, and means for varying the initial curvature and stress of said bimetallic member in accordance with a predetermined thermal condition at which the controlling device shall be operable.

18. A thermo-responsive controlling device comprising a pair of spaced supports, an initially stressed and curved bimetallic member resiliently secured between the supports and means for varying the initial curvature and stress of said bimetallic member in accordance with a predetermined thermal condition at which the controlling device shall be operable.

In testimony whereof, I have hereunto subscribed my name this 7th day of August, 1924.

HOWARD D. MATTHEWS.